(12) United States Patent
Kang et al.

(10) Patent No.: US 8,397,248 B2
(45) Date of Patent: Mar. 12, 2013

(54) COMPACT DISC HANDLING APPARATUS USED WITH A PRINTING MECHANISM FOR SURFACE PRINTING

(75) Inventors: Ho-Cheng Kang, Sinjhuang (TW); Sung-Hsuan Wang, Sinjhuang (TW)

(73) Assignee: Bluhen Tech Enterprise Ltd. (TW)

( * ) Notice: Subject to any disclaimer, the term of this patent is extended or adjusted under 35 U.S.C. 154(b) by 1202 days.

(21) Appl. No.: 12/239,597

(22) Filed: Sep. 26, 2008

(65) Prior Publication Data

US 2010/0083290 A1    Apr. 1, 2010

(51) Int. Cl.
*G11B 17/04* (2006.01)
(52) U.S. Cl. ......................................... 720/601; 720/600
(58) Field of Classification Search .................. 720/600, 720/601; 347/2–4, 153, 215
See application file for complete search history.

(56) References Cited

U.S. PATENT DOCUMENTS

| 6,871,946 B2 * | 3/2005 | Yanagi et al. ................. 347/101 |
| 8,266,640 B2 * | 9/2012 | Kang et al. .................... 720/601 |

\* cited by examiner

*Primary Examiner* — Hoa T. Nguyen
*Assistant Examiner* — Carlos E Garcia

(57) ABSTRACT

A compact disc handling apparatus comprises a frame body, a fixed board including a through hole and being fixed on the frame body, a sliding board including an inserting hole, a fixed plate being fixed in the inserting hole of the sliding board and having an area smaller than half of the area of the inserting hole, a movable plate movably installed in the inserting hole of the sliding board, a movable unit located between the fixed plate and the movable plate to enable the movement of the movable plate, a drive unit driving the sliding board to move transversely on the fixed board, and a control unit controlling the movement of the movable plate. The sliding board is movably assembled on an upper end surface of the fixed board in such a manner that the inserting hole is in alignment or staggered with the through hole.

10 Claims, 17 Drawing Sheets

COMPACT DISC HANDLING APPARATUS USED WITH A PRINTING MECHANISM FOR SURFACE PRINTING

BACKGROUND OF THE INVENTION

1. Field of the Invention

The present invention relates to a compact disc apparatus, and more particularly to a compact disc handling apparatus which can carry a compact disc into or out of a printing mechanism to perform a surface printing operation.

2. Description of the Prior Art

Commonly, a compact disc has one side that is a reflective surface where data can be written and read, and the other side to be printed with related instruction, drawings, etc.

As known, the compact discs are carried into a printing machine first, and then after printing operation, they will be collected or packaged. The compact disc surface printing operation is required to use a proper printing apparatus, such as the printing apparatus disclosed in Taiwan Patent No. 479596, which comprises a mould base provided with a disc cavity in a surface thereof for accommodation of a compact disc. In addition, the cavity is interiorly defined with plural air holes. The respective air holes penetrate the mould base and are connected to a negative air pressure source through a valve for absorbing the compact disc in the cavity. The cavity is further provided with at least one protruding point adjacent to the axis thereof, so that when the compact disc is placed in the cavity, the protruding point can be engaged in a groove or hole which is predefined in the compact disc for stably fixing the compact disc in the cavity.

Although the above technology can utilize the negative pressure to provide a fine positioning effect, obviously, the overall structure is complicated and expensive. Additionally, it is difficult to take the printed compact discs out of the printing apparatus, so that labor cost for collecting the printed compact discs is high.

The present invention has arisen to mitigate and/or obviate the afore-described disadvantages.

SUMMARY OF THE INVENTION

The primary objective of the present invention is to provide a compact disc handling apparatus which has the advantages such as simply structure and low cost.

The secondary objective of the present invention is to provide a compact disc handling apparatus which can facilitate the collection of the printed compact discs.

In order to achieve the above objectives, the compact disc handling apparatus of the present invention comprises a frame body, a fixed board including a through hole and being fixed on the frame body, a sliding board including an inserting hole and being movably assembled on an upper end surface of the fixed board in such a manner that the inserting hole is in alignment or staggered with the through hole, a fixed plate being fixed in the inserting hole of the sliding board and having an area smaller than half of the area of the inserting hole, a movable plate movably installed in the inserting hole of the sliding board, a movable unit located between the fixed plate and the movable plate to enable the movement of the movable plate, a drive unit including a movable drive arm, which can drives the sliding board to move transversely on the fixed board, and a control unit including a movable resisting arm, which can control the movement of the movable plate. Thus it can be seen that the structure of the present invention is simply, and the compact disc on the sliding board can automatically fall down along with the movement of the movable plate to achieve the objective of facilitating collection.

DETAILED DESCRIPTION OF THE PREFERRED EMBODIMENTS

Figure 1:
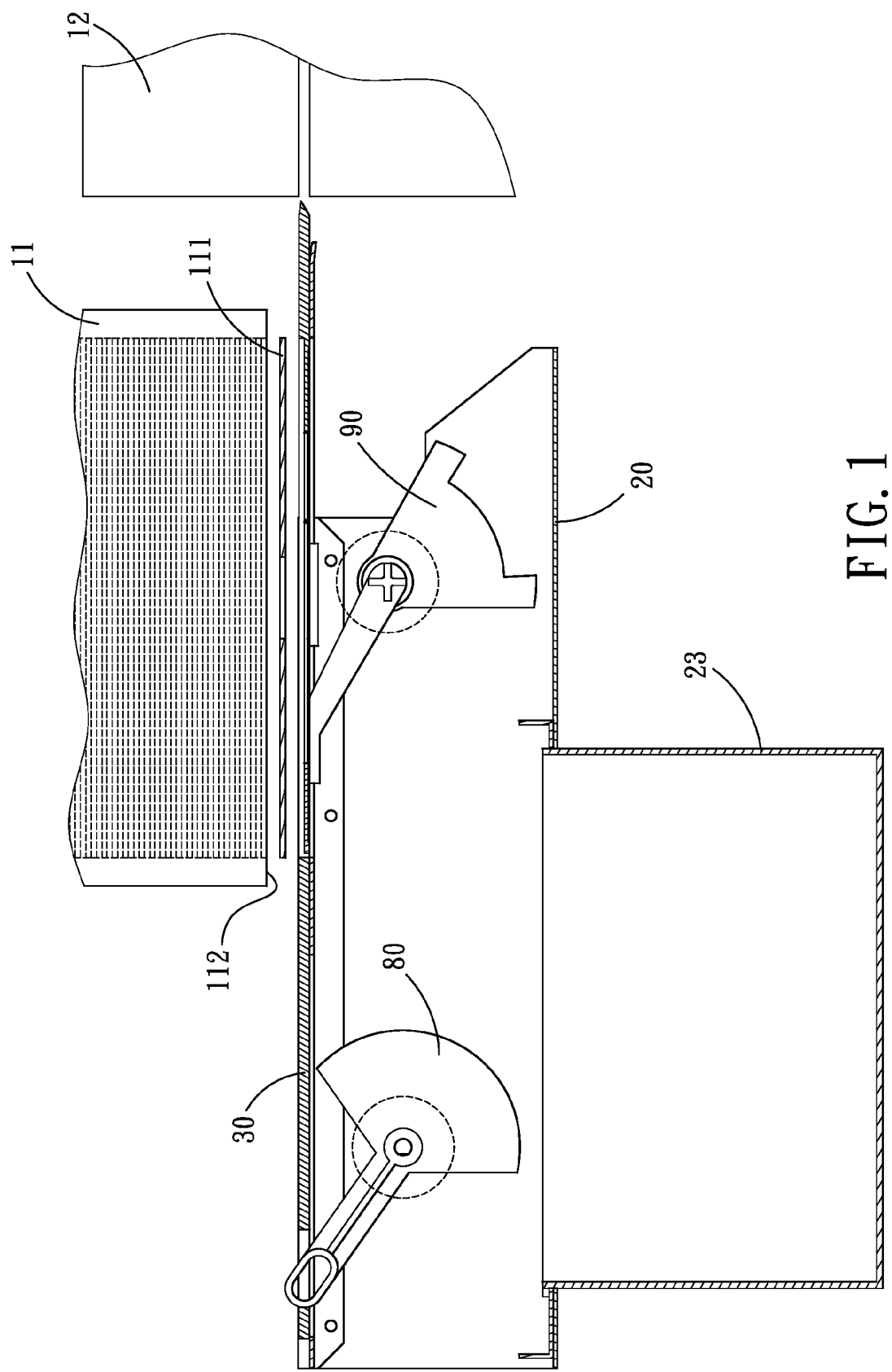
FIG. 1 is a perspective view of a disc-supplying apparatus and a printing mechanism in accordance with the present invention.
Figure 2:
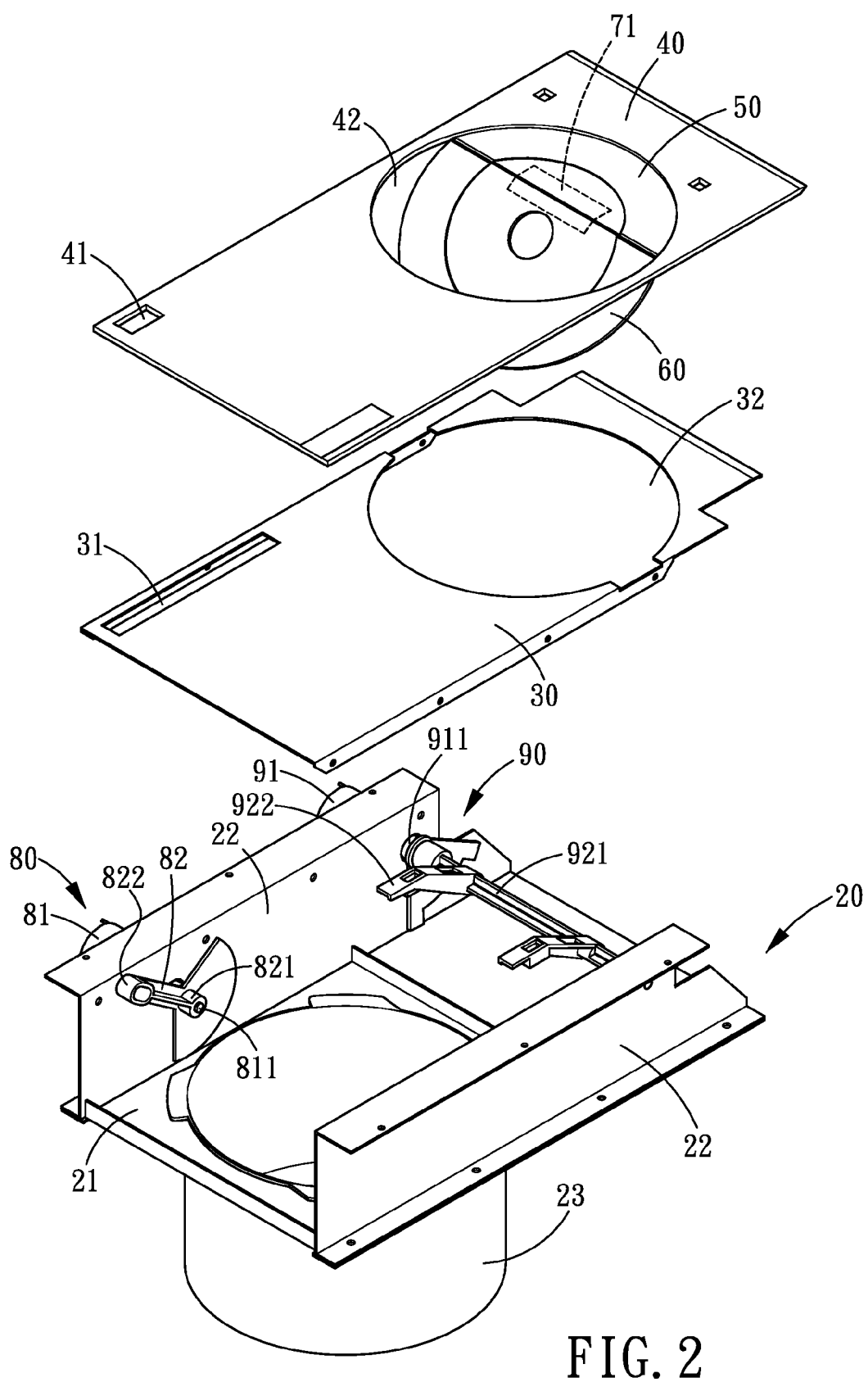
FIG. 2 is an exploded view of a compact disc handling apparatus in accordance with a first embodiment of the present invention.
Figure 3:
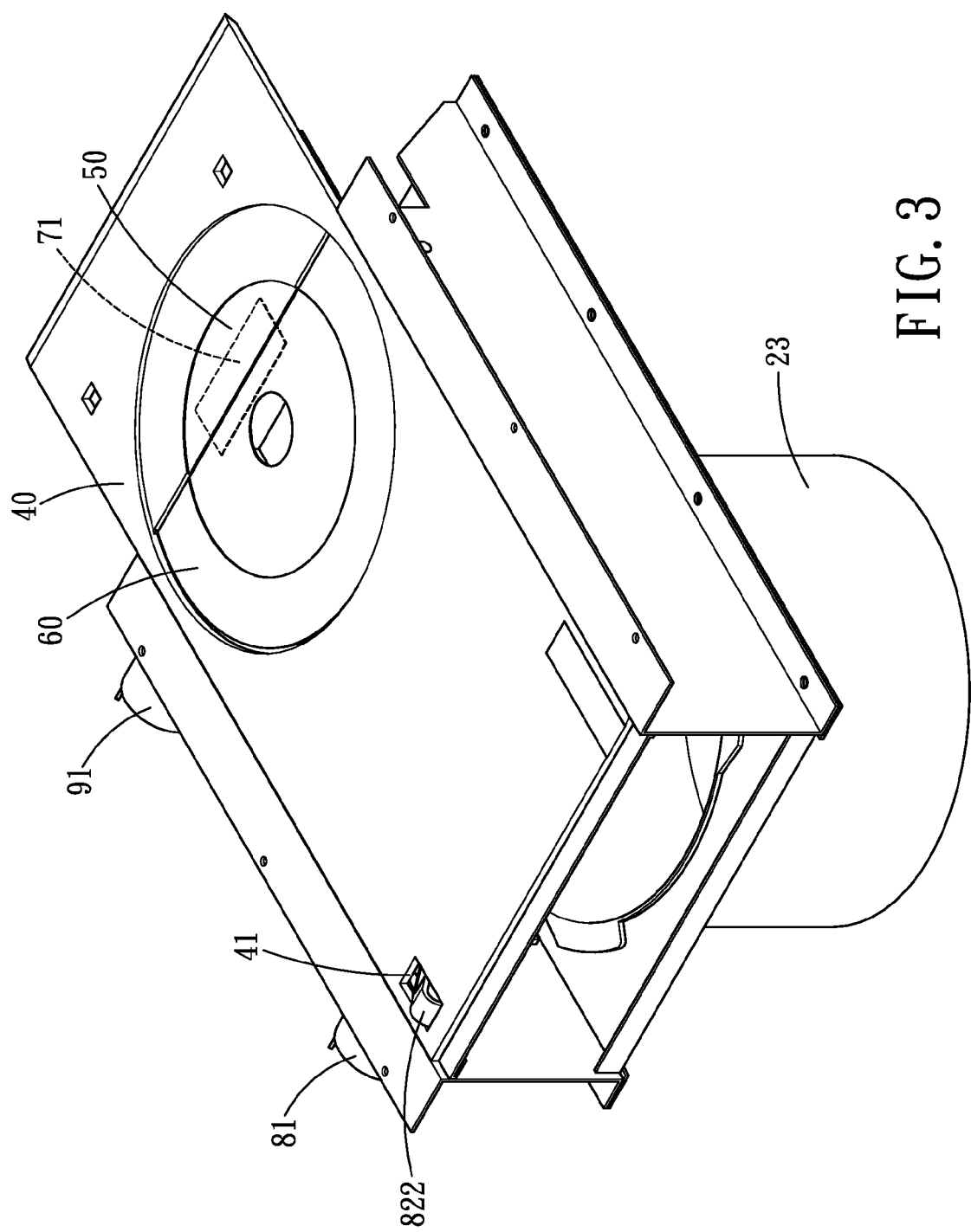
FIG. 3 is a perspective view of the compact disc handling apparatus in accordance with the first embodiment of the present invention.
Figure 4:
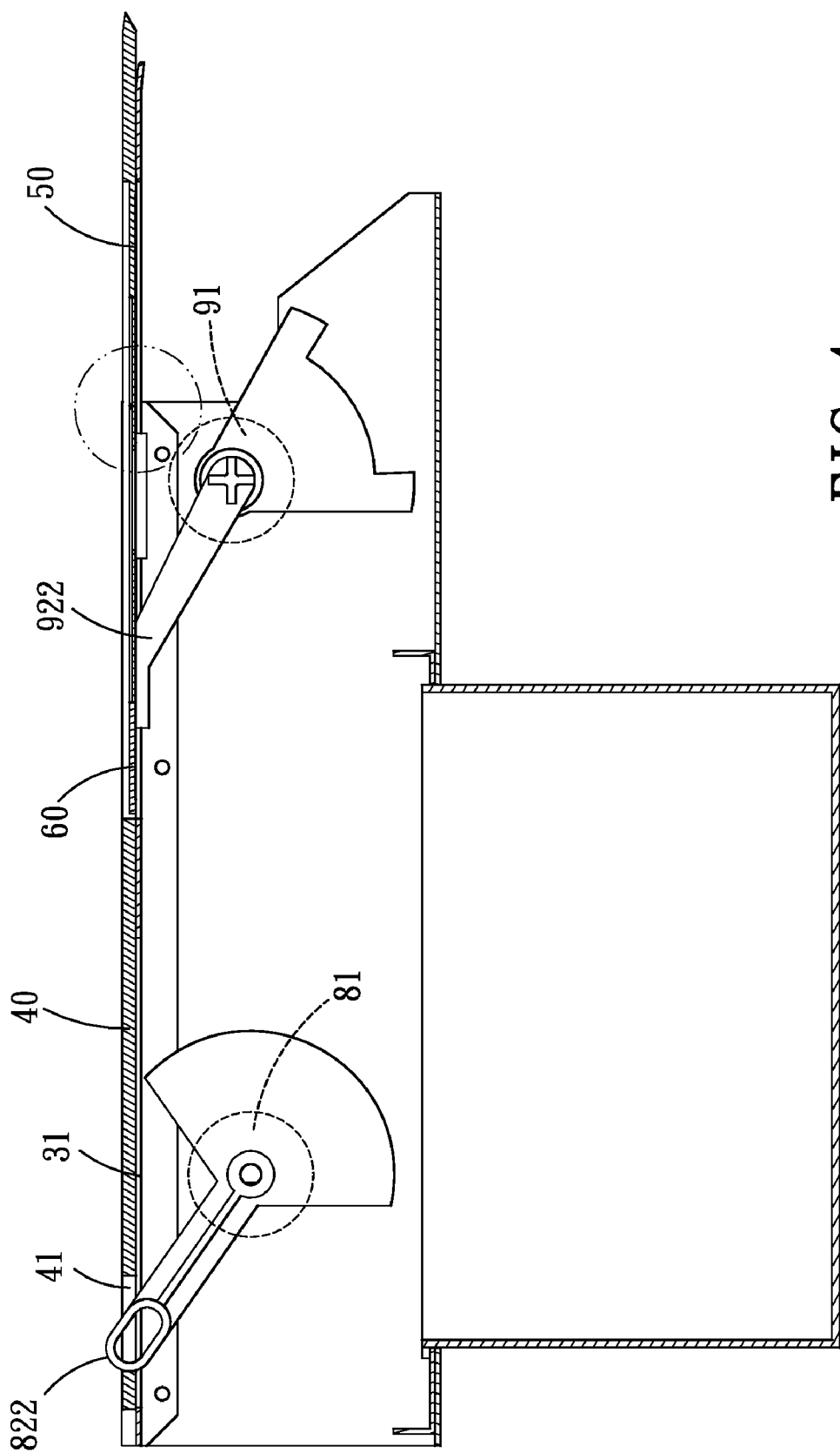
FIG. 4 is a cross sectional view of the compact disc handling apparatus in accordance with the first embodiment of the present invention.
Figure 4A:
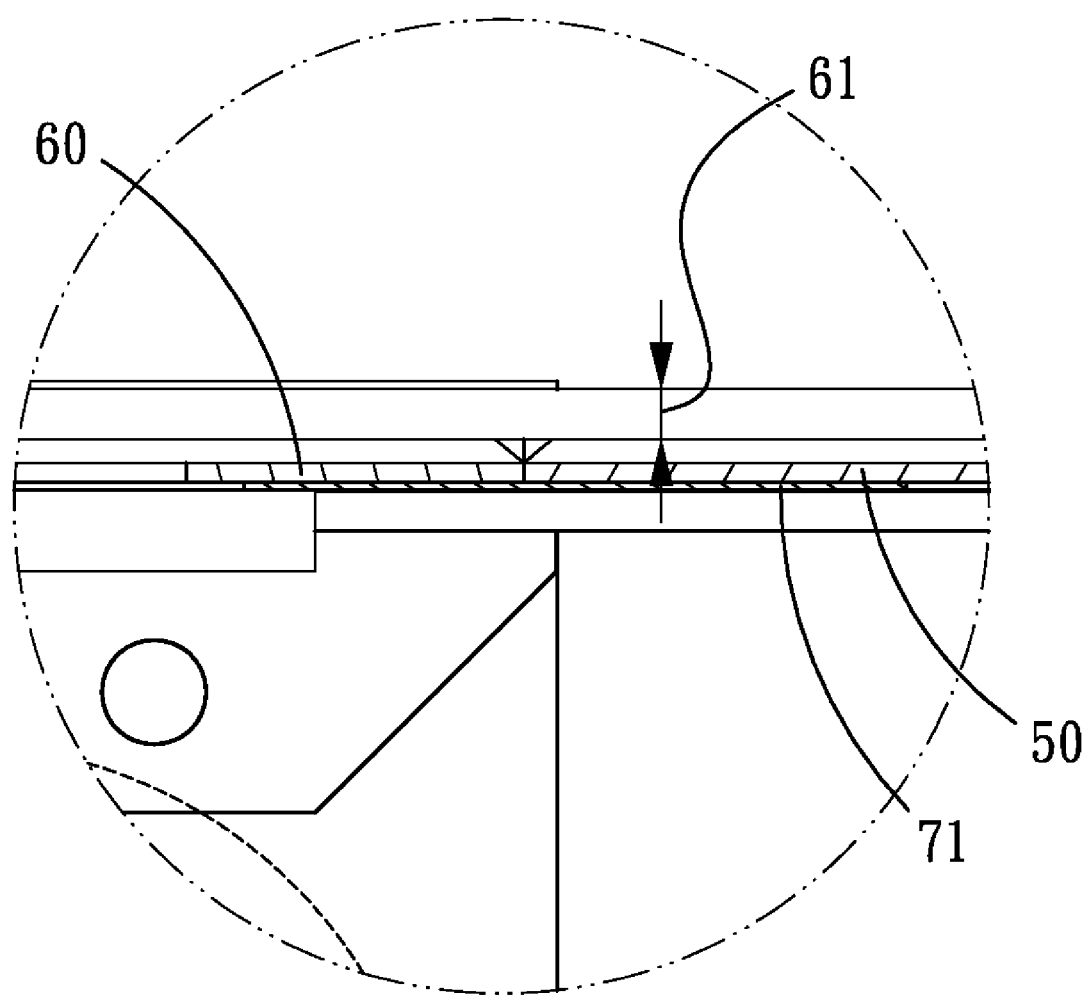
FIG. 4A is a partial enlarged view of FIG. 4.

The present invention will be clearer from the following description when viewed together with the accompanying drawings, which show, for purpose of illustrations only, the preferred embodiment in accordance with the present invention.

Referring to FIGS. 1-4A, a compact disc handling apparatus in accordance with a first embodiment of the present invention is provided to carry a compact disc 111 supplied from a disc-supplying apparatus 11 into or out of a printing mechanism 12 for performing a surface printing operation and essentially comprises a frame body 20, a fixed board 30, a sliding board 40, a fixed plate 50, a movable plate 60, a movable unit 70, a drive unit 80 and a control unit 90.

The frame body 20 includes a bottom board 21 and two side boards 22 that are disposed at both sides of the bottom board 21. The bottom board 21 is assembled with a compact disc collecting vessel 23.

The fixed board 30 includes an elongated slot 31 and a through hole 32 and is fixed between the two side boards 22 of the frame body 20.

The sliding board 40 includes an engaging hole 41 and an inserting hole 42. The sliding board 40 is movably assembled between the two side boards 22 of the frame body 20 and located on an upper end surface of the fixed board 30 in such a manner that the engaging hole 41 is in alignment with the slot 31 while the inserting hole 42 is in alignment or staggered with the through hole 32.

The fixed plate 50 has an arc-shaped circumference that is fixedly installed in the inserting hole 42 of the sliding board 40, and the area of the fixed plate 50 is smaller than half of the area of the inserting hole 42.

The movable plate 60 is movably installed in the inserting hole 42 of the sliding board 40. When the fixed plate 50 and the movable plate 60 are both located in the inserting hole 42, there is a height difference 61 between the surfaces of the fixed plate 50 and the movable plate 60 and the surface of sliding board 40, which can be as large as the thickness of a compact disc.

The movable unit 70 is a connecting plate 71 provided for connecting the fixed plate 50 and the movable plate 60. The fixed plate 50 and the movable plate 60 each are independent plates, so that the connecting plate 71 can make the movable plate 60 move relative to the fixed plate 50 or the sliding board 40 and enable the movable plate 60 to fall out of the inserting hole 42 and the through hole 32 of the fixed board 30.

The drive unit 80 includes a first motor 81 and a drive arm 82. The first motor 81 includes a drive shaft 811 and is fixed on one of the side boards 22 of the frame body 20. The drive shaft 811 is located between the two side boards 22. The drive arm 82 has two ends that are a fixed end 821 and a drive end 822. The fixed end 821 is fixedly connected to the drive shaft 811 to drive the drive arm 82 to swing with the drive shaft 811. Meanwhile, the drive arm 82 penetrates the slot 31 of the fixed board 30 to make the drive end 822 be located in the engaging hole 41 of the sliding board 40, so as to drive the sliding board 40 to move transversely on the fixed board 30.

The control unit 90 includes a second motor 91 and a resisting arm 92. The second motor 91 includes a drive shaft 911 and is fixed on one of the side boards 22 of the frame body 20. The drive shaft 911 is located between the two side boards 22. The drive arm 92 includes a fixed end 921 and a resisting end 922. The fixed end 921 is fixedly connected with the drive shaft 911 to make the resisting arm 92 swing with the drive shaft 911. Meanwhile, the resisting end 922 penetrates the through hole 32 of the fixed board 30 to resist against the movable plate 60, so as to control the movement of the movable plate 60.

The aforementioned is the summary of the positional and structural relationship of the respective components of the first embodiment in accordance with the present invention.

For a better understanding of the first embodiment of the present invention, its operation and function, reference should be made to FIG. 1:

Firstly, the first motor 81 of the drive unit 80 is controlled to locate the inserting hole 42 of the sliding board 40 at a disc output end 112 of the disc-supplying apparatus 11 to carry the to-be-printed compact disc 111 supplied from the disc-supplying apparatus 11.

Figure 5:
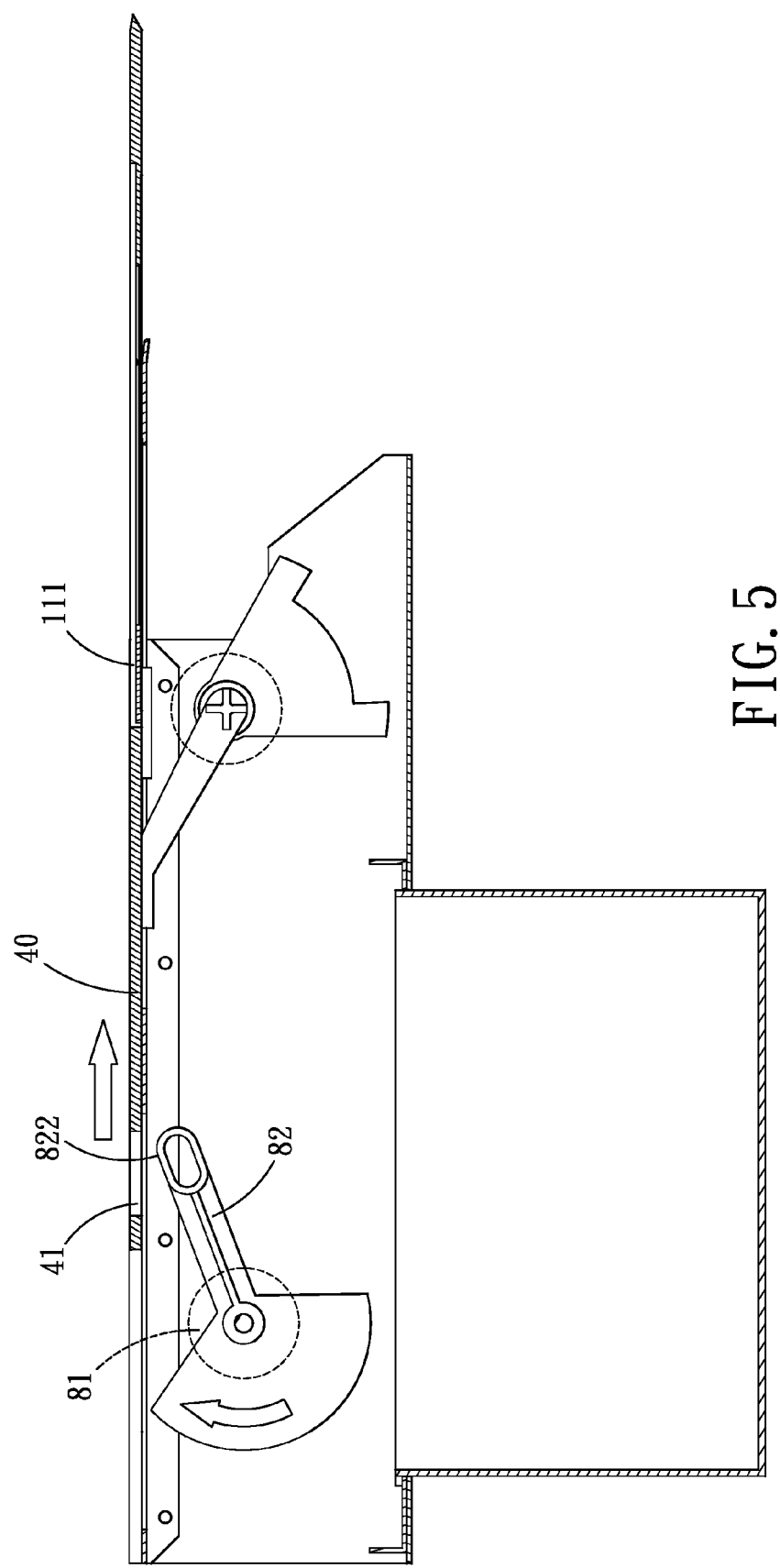
FIG. 5 is an operational view of the compact disc handling apparatus in accordance with the first embodiment of the present invention.

After that, as shown in FIG. 5, the first motor 81 is controlled to rotate clockwise to drive the drive arm 82 to move synchronously to make the drive end 822 abut against the engaging hole 41 of the sliding board 40, so as to move the sliding board 40 transversely towards the printing position for performing the surface printing operation to the compact disc.

After the printing operation, the first motor 81 will be controlled to rotate counterclockwise to make the sliding board 40 return to its original position.

Figure 6:
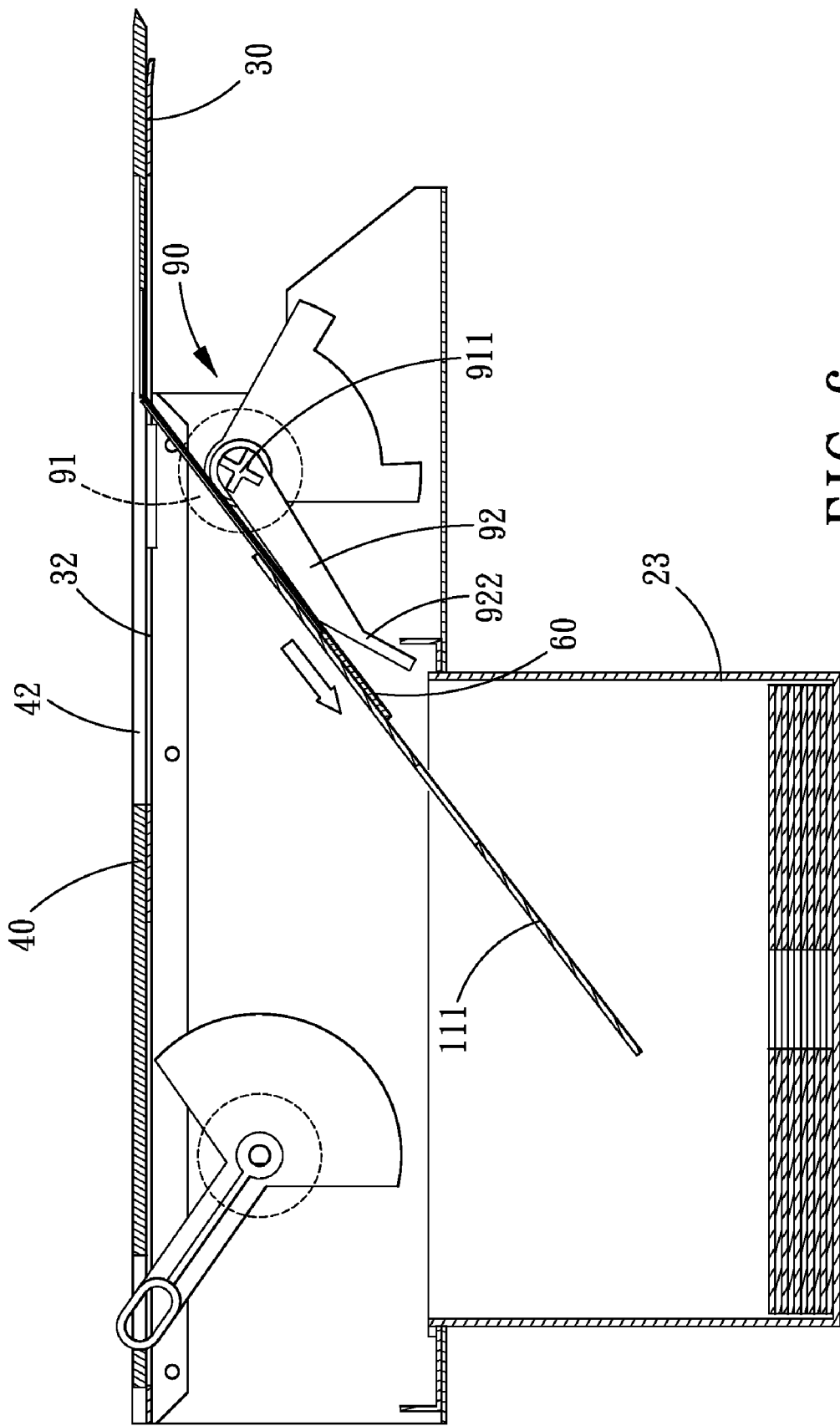
FIG. 6 is another operational view of the compact disc handling apparatus in accordance with the first embodiment of the present invention.

Subsequently, as shown in FIG. 6, the second motor 91 of the control unit 90 will be controlled to make the drive shaft 911 rotate counterclockwise to make the resisting end 922 of the resisting arm 92 swing downwards. With the downward swinging operation of the resisting end 922, the movable plate 60 will fall out of the through hole 32 of the fixed board 30 and the inserting hole 42 of the sling board 40. In this case, the movable plate 60 will be in an inclined state, at this moment, the compact disc 111 located in the inserting hole 42 can slide down automatically along the inclined movable plate 60 and slide into the compact disc collecting vessel 23. Ultimately, after the compact disc 111 slides down into the collecting vessel 23, the second motor 91 of the control unit 90 will be controlled to make the drive shaft rotate clockwise to allow the resisting end 922 of the resisting arm 92 to drive the movable plate 60 to swing upwards synchronously until the movable plate 60 returns to its original position for waiting for next printing operation.

Hence, inside the frame body 20, the fixed board 30, the sliding board 40, the fixed plate 50, the movable plate 60, the movable unit 70, the drive unit 80 and the control unit 90 are assembled to constitute a compact disc handling apparatus of the present invention, which is simply-structured and easy to assemble, thus achieving the objectives of simply structure and low cost. In addition, after being printed, the compact disc 111 can fall down automatically, thus satisfying the practical requirement of easy to collect.

Figure 7:
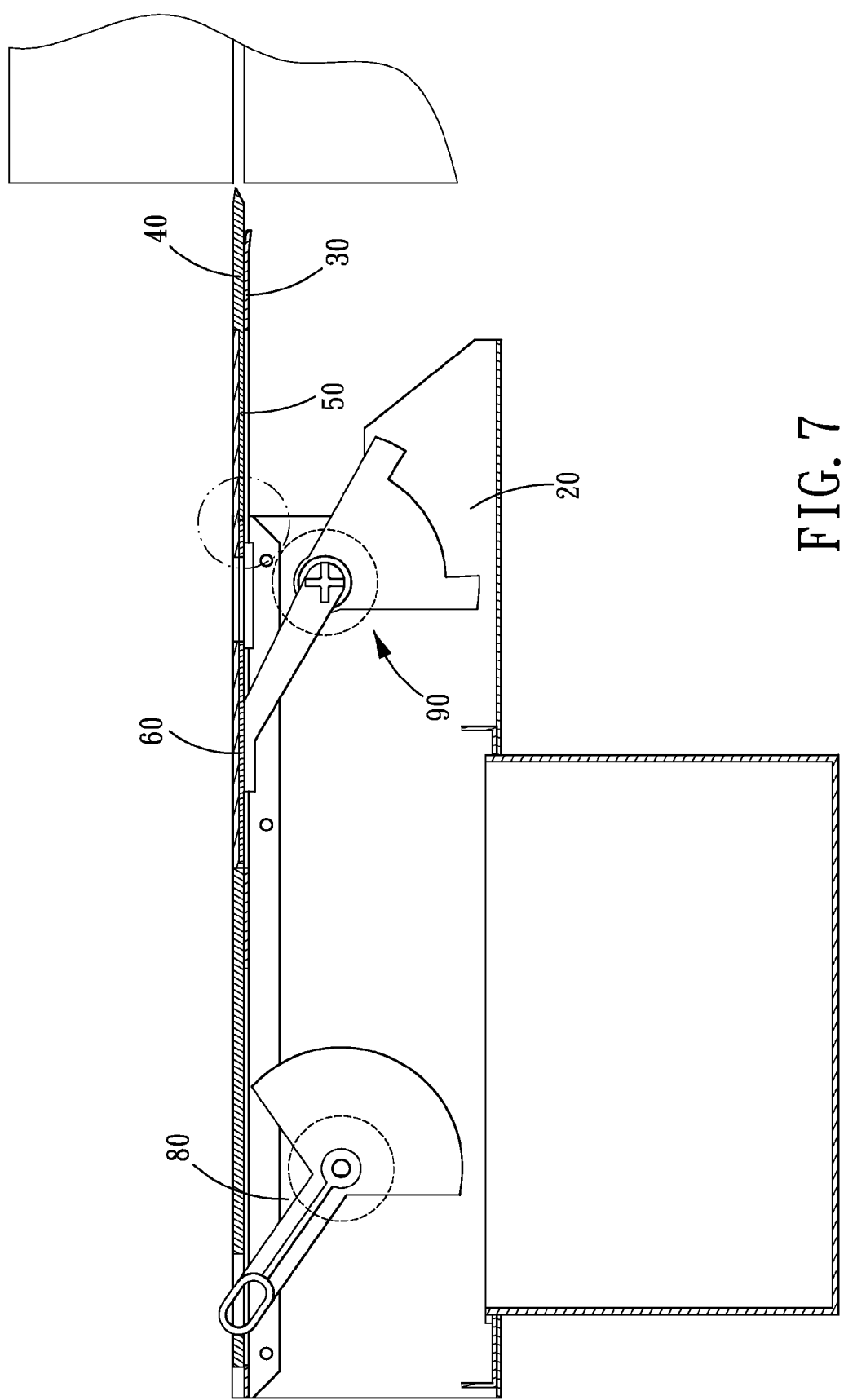
FIG. 7 is a cross sectional view of a compact disc handling apparatus in accordance with a second embodiment of the present invention.
Figure 7A:
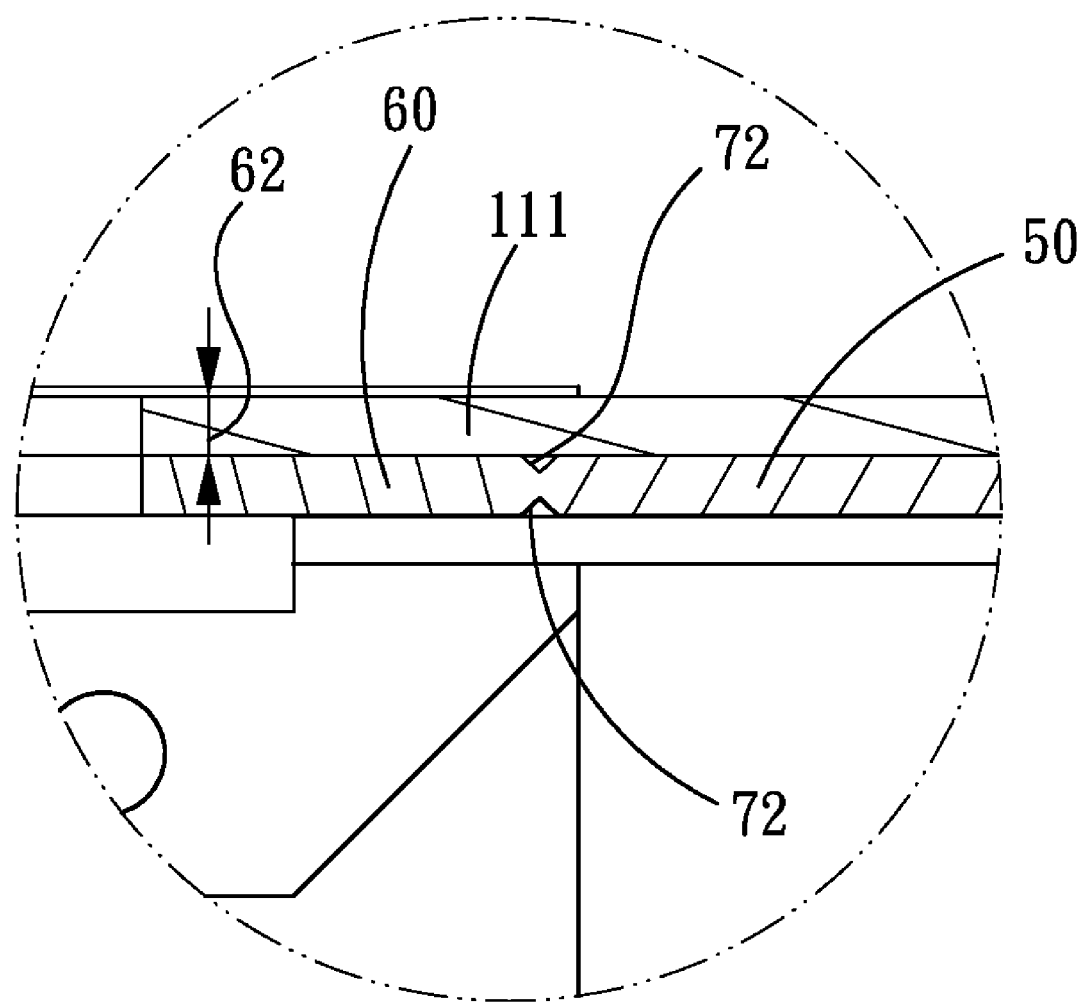
FIG. 7A is a partial enlarged view of FIG. 7.

Referring to FIGS. 7-7A, a compact disc handling apparatus in accordance with a second embodiment of the present invention essentially comprises a frame body 20, a fixed board 30, a sliding board 40, a fixed plate 50, a movable plate 60, a movable unit 70, a drive unit 80 and a control unit 90. The configuration and function of all the above components of the present embodiment are the same as that of the corresponding components of the first embodiment of the present invention, so further explanation will be omitted herein. The difference between the first embodiment and the second embodiment of the present invention is described as follows:

The fixed plate 50 and the movable plate 60 can be the same plate, and the movable unit 70 is one or two grooves 72. It is to be noted that the two grooves 72 are oppositely located. In addition, there is a height difference 62 between the surfaces of fixed plate 50 and the movable plate 60 and the surface of the sliding board 40.

Figure 8:
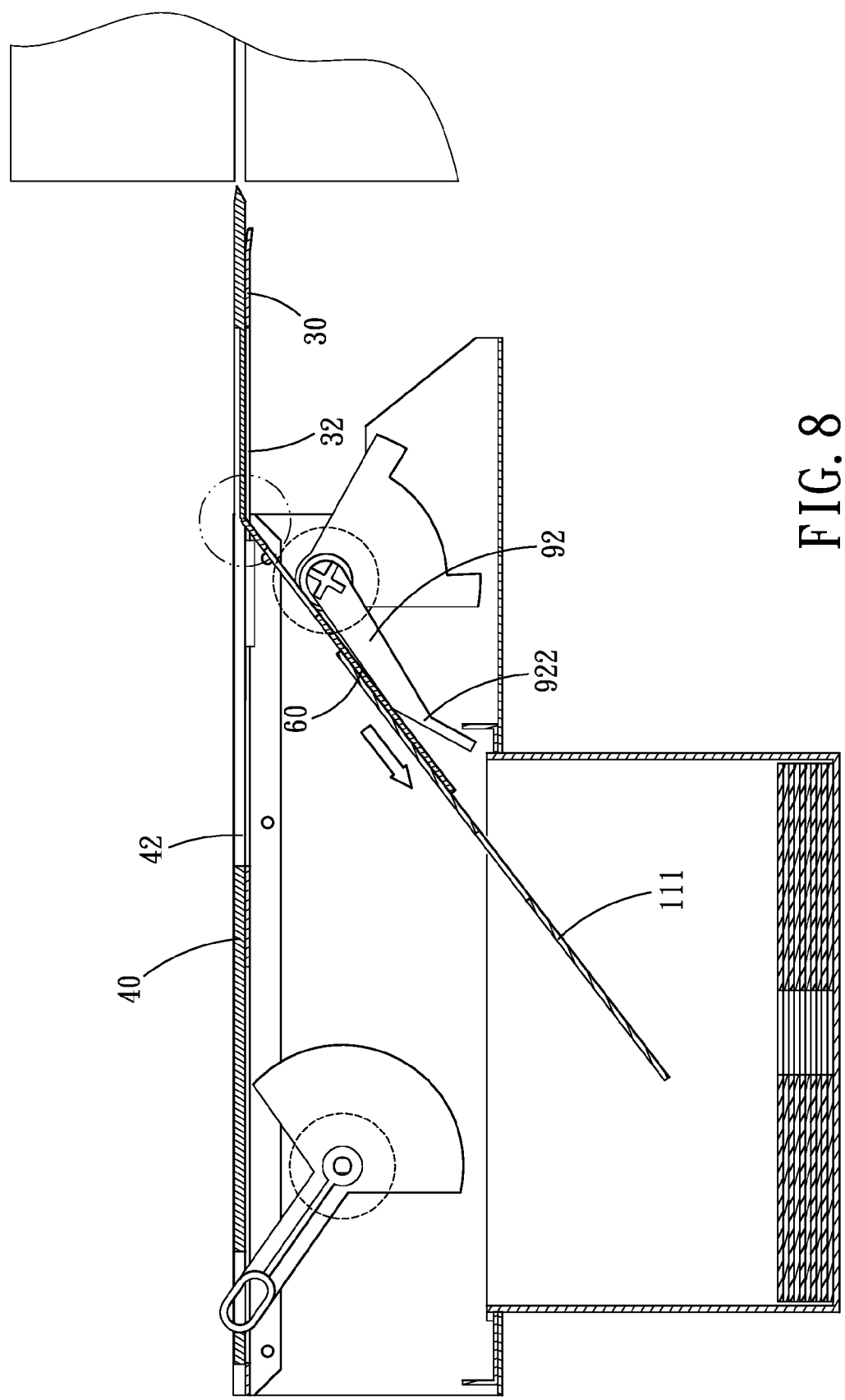
FIG. 8 is an operational view of the compact disc handling apparatus in accordance with the second embodiment of the present invention.
Figure 8A:
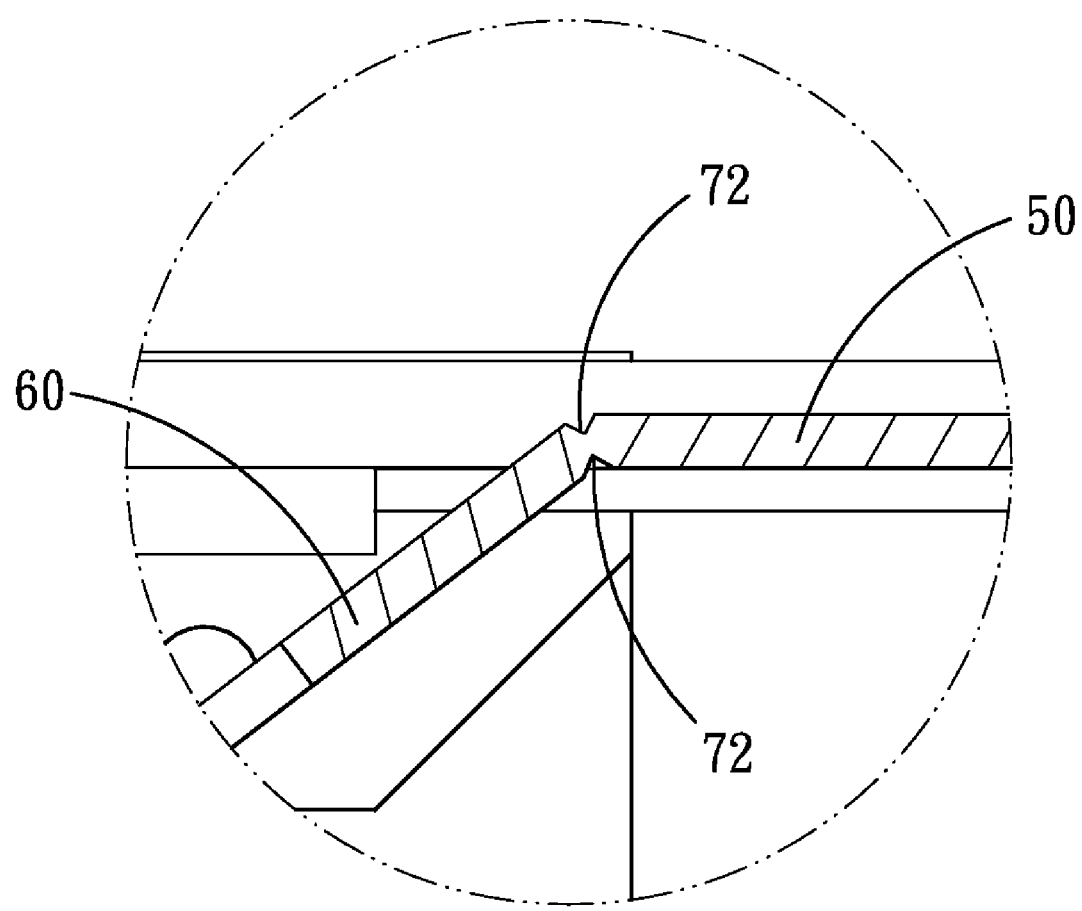
FIG. 8A is a partial enlarged view of FIG. 8A.
Figure 9:
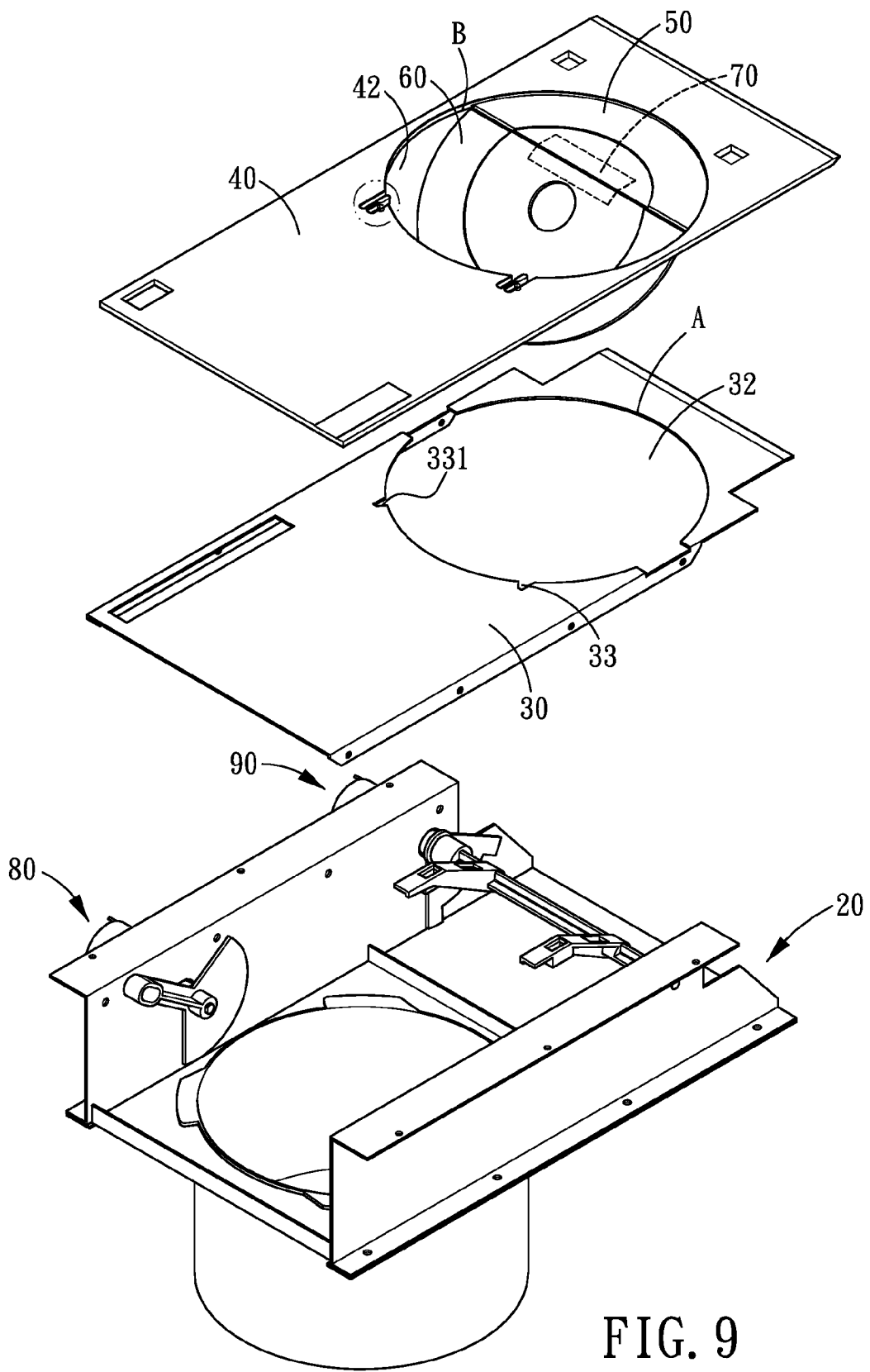
FIG. 9 is an exploded view of a compact disc handling apparatus in accordance with a third embodiment of the present invention.
Figure 9A:
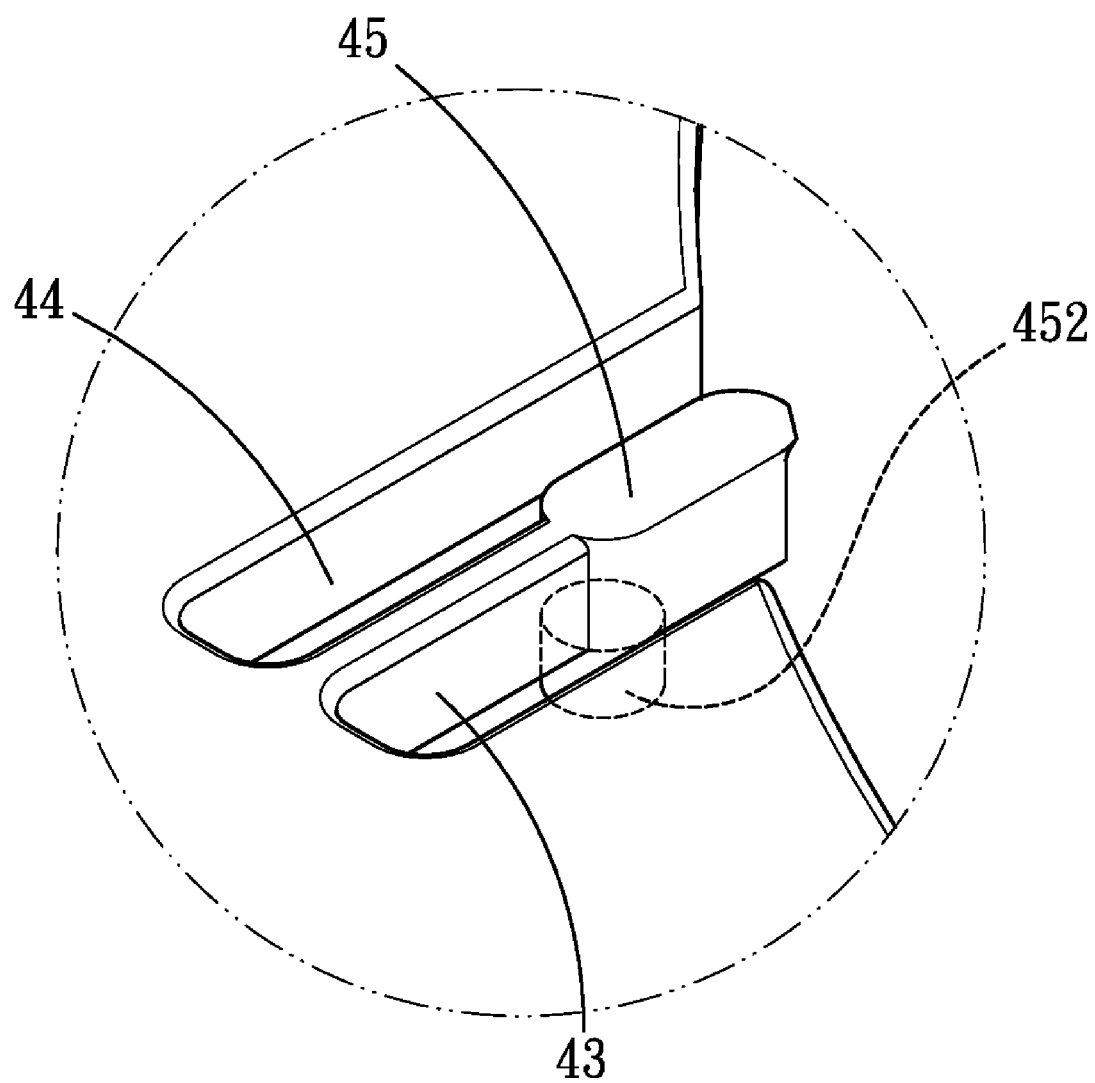
FIG. 9A is a partial enlarged view of compact disc handling apparatus in accordance with the third embodiment of the present invention.
Figure 10:
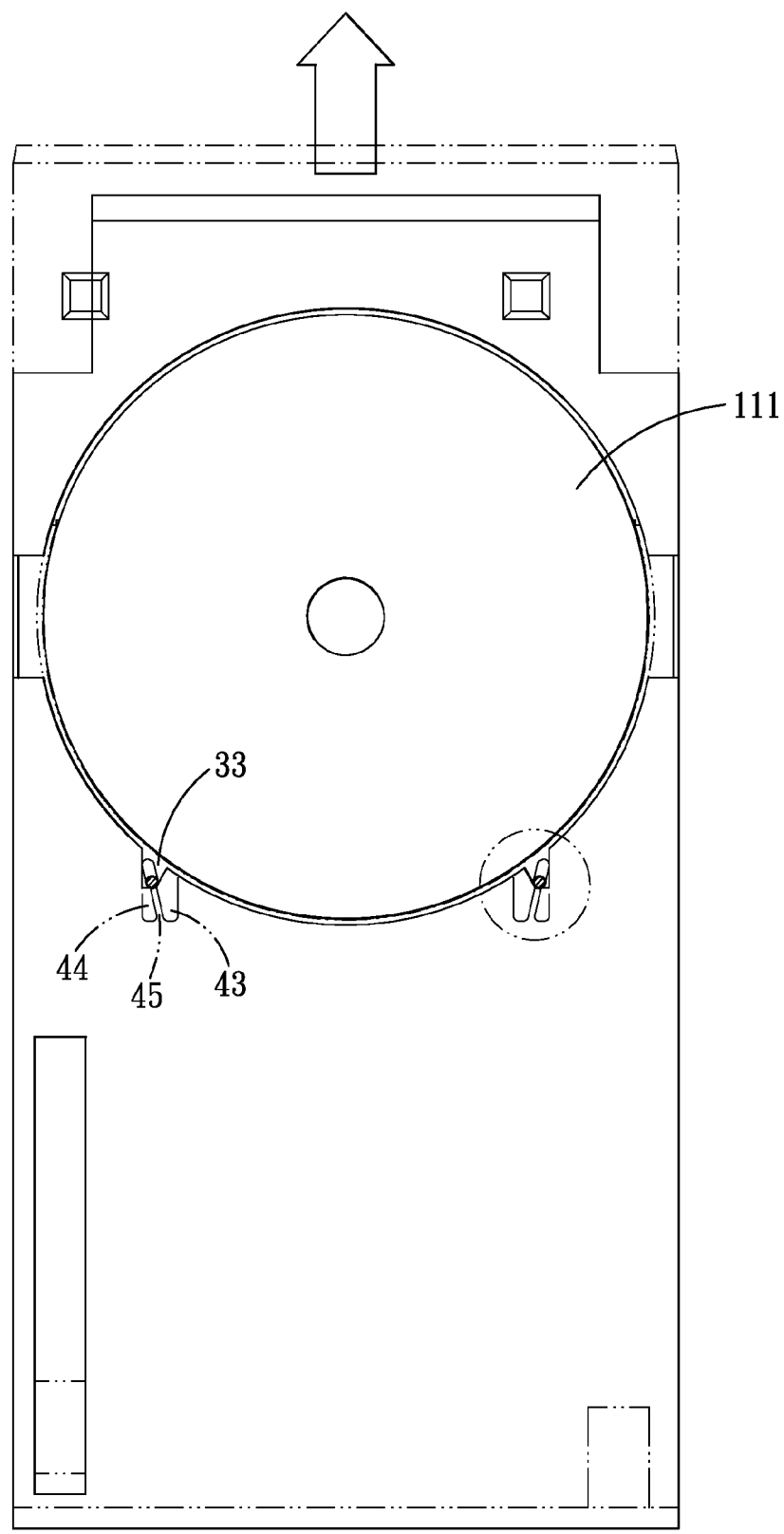
FIG. 10 is an operational view of the compact disc handling apparatus in accordance with the third embodiment of the present invention.
Figure 10A:
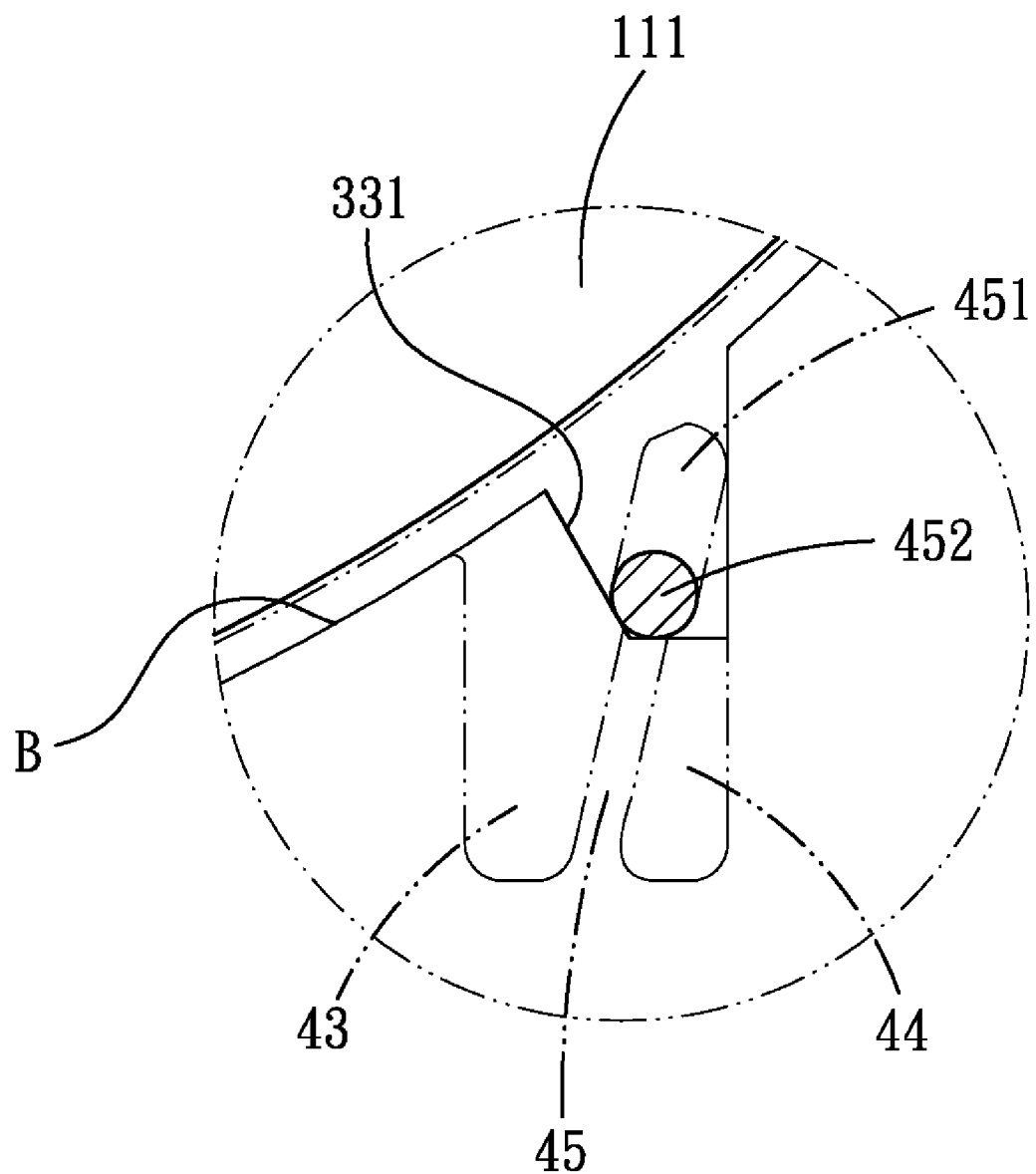
FIG. 10A is a partial enlarged view of FIG. 10.
Figure 11:
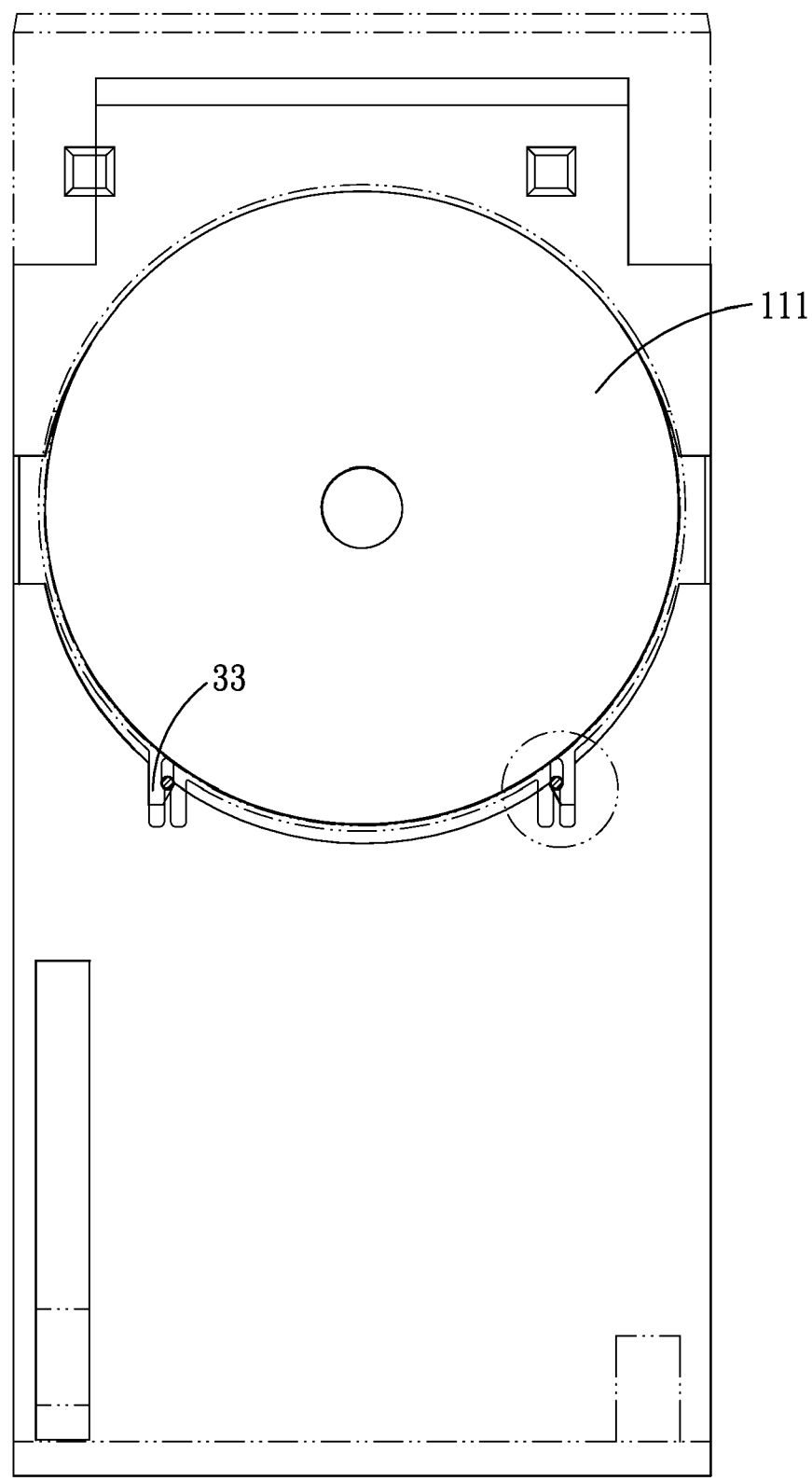
FIG. 11 is another operational view of the compact disc handling apparatus in accordance with the third embodiment of the present invention.
Figure 11A:
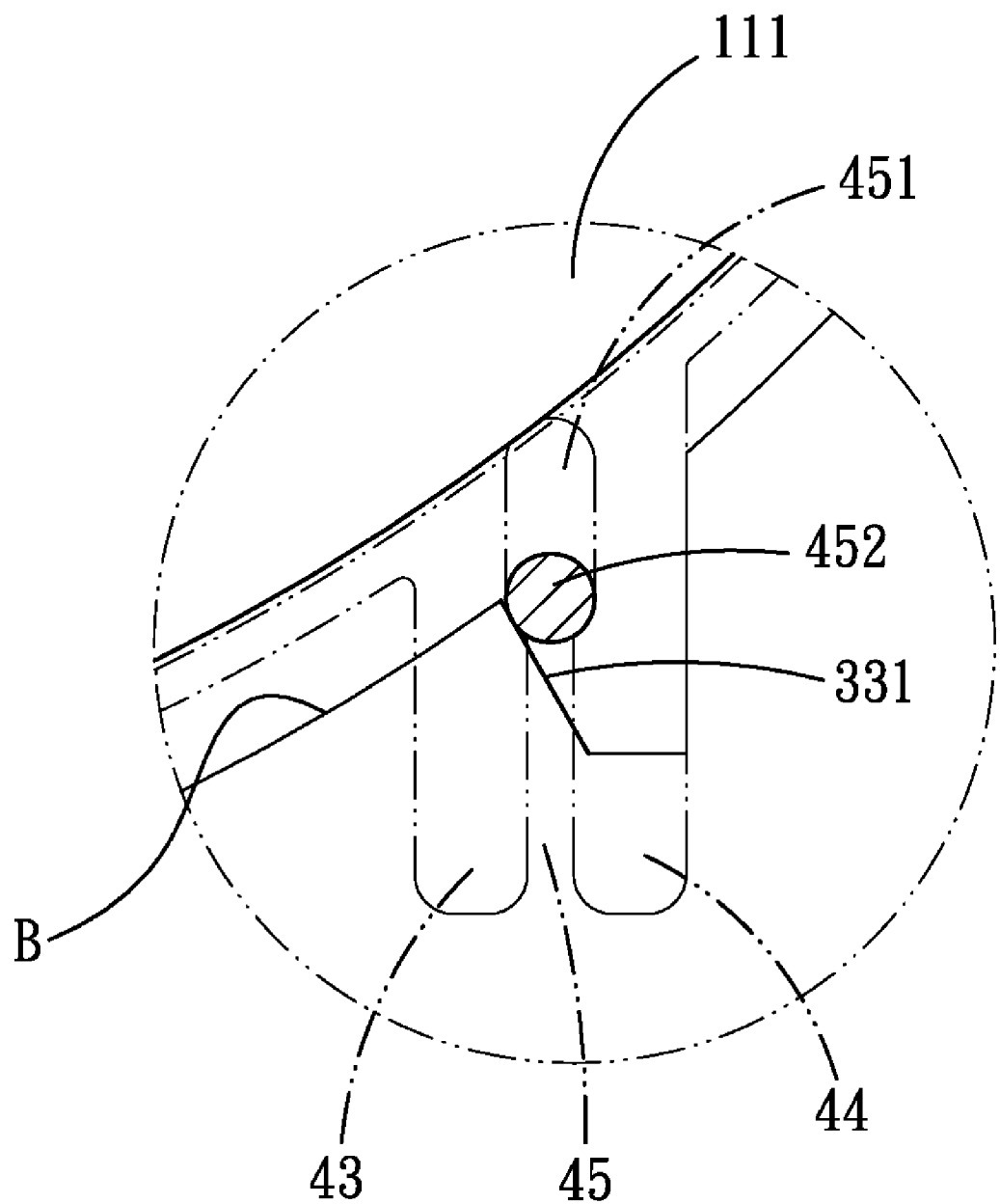
FIG. 11A is a partial enlarged view of FIG. 11.

Referring to FIGS. 8 and 8A, the two grooves 72 are designed in such a manner that the movable plate 60 can swing with the resisting end 922 of the resisting arm 92 and falls out of the through hole 32 of the fixed board 30 and the inserting hole 42 of the sliding board 40. In this case, the movable plate 60 can be in an inclined state, so that the compact disc 11 in the inserting hole 42 can automatically slide down along the inclined movable plate 60 for carrying out collection.

Referring to FIGS. 9-11A, a compact disc handling apparatus in accordance with a third embodiment of the present invention comprises a frame body 20, a fixed board 30, a sliding board 40, a fixed plate 50, a movable plate 60, a movable unit 70, a drive unit 80 and a control unit 90. The configuration and function of all the above components of the present embodiment are the same as that of the corresponding components of the first embodiment of the present invention, so further explanation will be omitted herein. The difference between the first embodiment and the third embodiment of the present invention is described as follows:

The through hole 32 of the fixed board 30 includes a first hole edge A which is formed with an opening 33 at each of two predetermined positions, and each of the openings 33 has a guiding inclined surface 331.

The inserting hole 42 of the sliding board 40 includes a second hole edge B which is formed with a first recess 43 and a second recess 44 at each of two predetermined positions thereof. The two recesses 43, 44 define a clamping arm 45. The clamping arm 45 has a free end being a clamping portion 451 and includes a protruding portion 452 which can movably abut against the guiding inclined surface 331 of the opening 33 of the fixed board 30, so as to make the clamping arm 45 move correspondingly to the opening 33 to allow the clamping portion 451 to extend out of or retract into the second hole edge B.

As for the operation manner and the function of the third embodiment of the third embodiment of the present invention, when the sliding board 40 is to carry the compact disc 111, the drive unit 80 can be controlled to drive the sliding board 40 to slide toward a direction opposite the printing position, at this moment, the protruding portion 452 of the clamping arm 45 abuts against the outer end of the guiding inclined surface 331 of the opening 33 and then moves toward the inner end of the guiding inclined surface 331 of the opening 33 along the guiding inclined surface 331 to make the clamping arm 45 deflect toward the second recess 44, thus finally making the clamping portion 451 retract into the hole edge B, so that the inserting hole 42 of the sliding board 40 can carry the disc 111. After the sliding board 40 carries the compact disc 111, the drive unit 80 will be controlled to drive the sliding board to slide toward the printing position, at this moment, the clamping arm 45 will deflect toward to the first recess 43 to return to its original position by its inherent restoring force, meanwhile, the clamping portions 451 extend out of the hole edge B to clamp the compact disc 111, thus improving the stability of the compact disc 111 in the inserting hole 42 of the sliding board 40.

While we have shown and described various embodiments in accordance with the present invention, it is clear to those skilled in the art that further embodiments may be made without departing from the scope of the present invention.

What is claimed is:

1. A compact disc handling apparatus being used to carry a compact disc into or out of a printing mechanism, comprising:
    a frame body;
    a fixed board including a through hole and being fixed on the frame body, wherein the through hole includes a first hole edge formed with at least one opening;
    a sliding board including an inserting hole and being movably assembled to an upper end surface of the fixed board, the inserting hole being in alignment or staggered with the through hole, wherein the inserting hole includes a second hole edge formed with at least one pair of recesses, and the two recesses define a clamping arm having a free end being a clamping portion; the clamping arm can move correspondingly to the opening of the first hole edge for making the clamping portion thereof extend out of or retract into the second hole edge;
    a fixed plate being fixed in the inserting hole of the sliding board and having an area smaller than half of an area of the inserting hole;
    a movable plate being movably installed in the inserting hole of the sliding board;
    a movable unit being located between the fixed plate and the movable plate to enable a movement of the movable plate;
    a drive unit being provided to drive the sliding board to move transversely on the fixed board; and
    a control unit being provided to control the movement of the movable plate.

2. The compact disc handling apparatus as claimed in claim 1, wherein the frame body is assembled with a disc collecting vessel at a bottom thereof.

3. The compact disc handling apparatus as claimed in claim 1, wherein the drive unit includes a movable drive arm and is installed on the frame body with the drive arm being connected with the sliding board.

4. The compact disc handling apparatus as claimed in claim 3, wherein the control unit includes a movable resisting arm and is installed on the frame body, the resisting arm penetrates the through hole of the fixed board and resists the movable plate to control the movement of the movable plate.

5. The compact disc handling apparatus as claimed in claim 4, wherein the fixed board further includes a slot, the drive arm of the drive unit penetrates the slot to connect with the sliding board.

6. The compact disc handling apparatus as claimed in claim 5, wherein the sliding board further includes an engaging hole for insertion of a free end of the drive arm.

7. The compact disc handling apparatus as claimed in claim 3, wherein the drive unit further includes a first motor including a drive shaft connected with the drive arm.

8. The compact disc handling apparatus as claimed in claim 7, wherein the control unit further includes a second motor including a drive shaft connected to a resisting arm.

9. The compact disc handling apparatus as claimed in claim 1, wherein the movable unit is a connecting plate for connecting the fixed plate and the movable plate.

10. The compact disc handling apparatus as claimed in claim 1, wherein the opening of the fixed board includes a guiding inclined surface, the clamping arm of the sliding board includes a protruding portion, which movably abuts against the guiding inclined surface to cause the clamping arm to swing.

* * * * *